(12) United States Patent
Taillard

(10) Patent No.: US 11,420,596 B2
(45) Date of Patent: Aug. 23, 2022

(54) WINDSCREEN WIPER DEVICE

(71) Applicant: TRICO BELGIUM SA, Aubange (BE)

(72) Inventor: Arthur Taillard, Herserange (FR)

(73) Assignee: TRICO BELGIUM SA, Aubange (BE)

( * ) Notice: Subject to any disclaimer, the term of this patent is extended or adjusted under 35 U.S.C. 154(b) by 0 days.

(21) Appl. No.: 16/967,022

(22) PCT Filed: Feb. 5, 2018

(86) PCT No.: PCT/EP2018/052776
§ 371 (c)(1),
(2) Date: Aug. 3, 2020

(87) PCT Pub. No.: WO2019/149380
PCT Pub. Date: Aug. 8, 2019

(65) Prior Publication Data
US 2021/0039607 A1   Feb. 11, 2021

(51) Int. Cl.
*B60S 1/38* (2006.01)
(52) U.S. Cl.
CPC ............... *B60S 1/3865* (2013.01); *B60S 1/38* (2013.01); *B60S 1/3858* (2013.01)
(58) Field of Classification Search
CPC ............. B60S 1/34; B60S 1/4087; B60S 1/38
See application file for complete search history.

(56) References Cited

U.S. PATENT DOCUMENTS

| 2007/0226940 | A1 | 10/2007 | d'Essuyage | |
|---|---|---|---|---|
| 2011/0047742 | A1 | 3/2011 | Kim et al. | |
| 2014/0289990 | A1* | 10/2014 | Boulanger | B60S 1/3849 |
| | | | | 15/250.361 |
| 2017/0129462 | A1* | 5/2017 | Friscioni | B60S 1/3808 |
| 2019/0135238 | A1* | 5/2019 | Seiller | B60S 1/40 |
| 2021/0179028 | A1* | 6/2021 | Boland | B60S 1/3849 |

FOREIGN PATENT DOCUMENTS

| EP | 1403156 | 3/2004 | |
|---|---|---|---|
| WO | WO-2013170877 A1 * | 11/2013 | ............ B60S 1/4087 |

* cited by examiner

*Primary Examiner* — Michael D Jennings
(74) *Attorney, Agent, or Firm* — Bryan Cave Leighton Paisner LLP

(57) ABSTRACT

A connecting device for interconnecting a windscreen wiper device of the flat blade type and an oscillating arm pivotally connectable to the connecting device about a pivot axis near one end thereof. The windscreen wiper device comprises an elastic, elongated carrier element, as well as an elongated wiper blade of a flexible material, which can be placed in abutment with a windscreen to be wiped. The wiper blade includes at least one groove, in which a longitudinal strip of the carrier element is disposed. The connecting device comprises a first part arranged to be connected to the windscreen wiper device, as well as a second part arranged to be interposed between the first part and the oscillating arm. The second part is arranged to be pivotally connected to the first part optionally around a first pivot axis or around a second pivot axis.

20 Claims, 2 Drawing Sheets

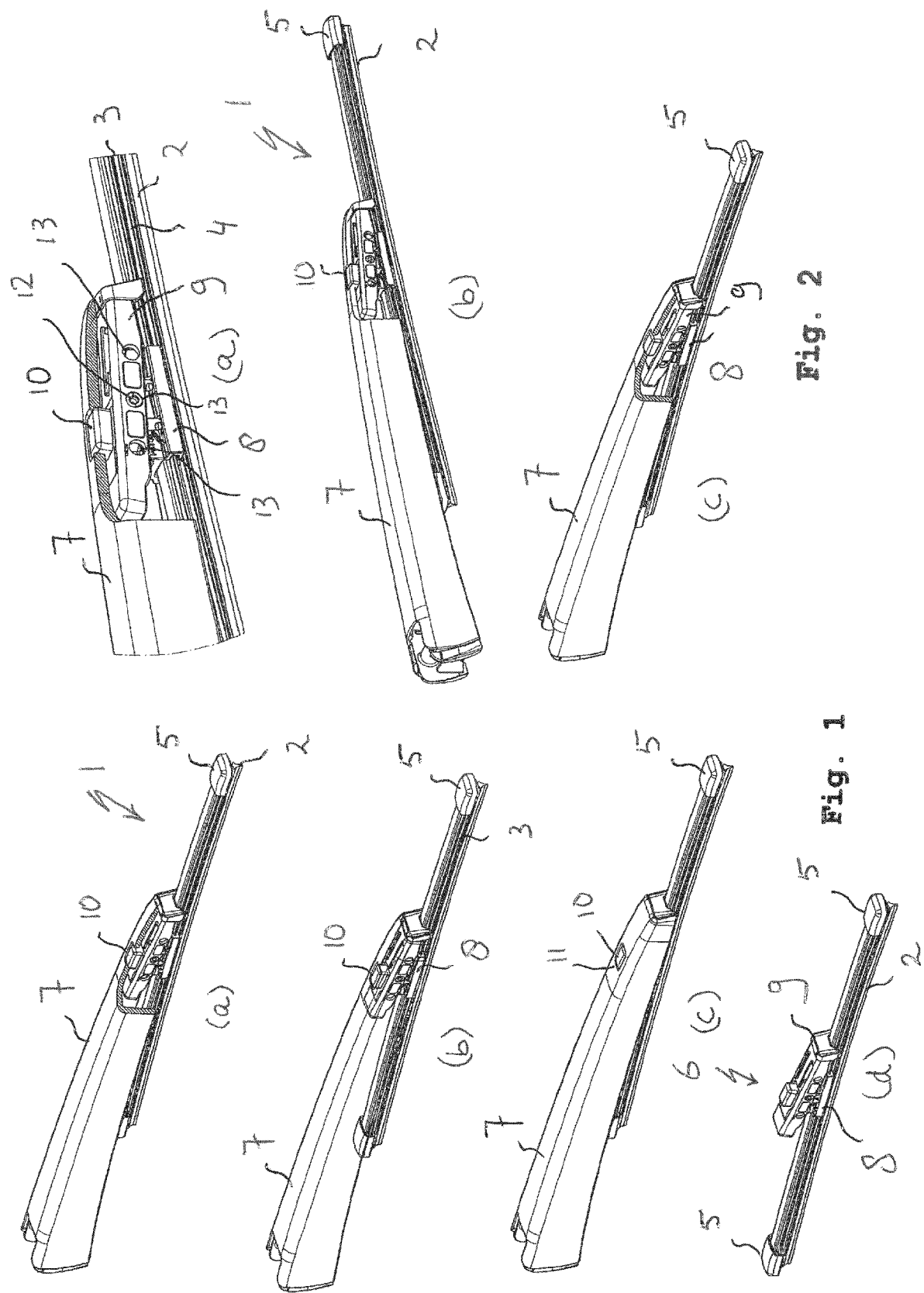

WINDSCREEN WIPER DEVICE

BACKGROUND OF THE INVENTION

A windscreen wiper device of the flat blade type, particularly for automobiles, comprises an elastic, elongated carrier element, as well as an elongated wiper blade of a flexible material, which can be placed in abutment with a windscreen to be wiped. The wiper blade includes at least one longitudinal groove, in which groove at least one longitudinal strip of the carrier element is disposed. The windscreen wiper device includes a connecting device for an oscillating arm, where the oscillating arm can be pivotally connected to the connecting device about a pivot axis near one end thereof.

Such a windscreen wiper device is generally known as a so-called "flat blade" or "yokeless blade" because no use is made of several yokes pivotally connected to each other. Instead, the wiper blade is biased by the carrier element, as a result of which it exhibits a specific curvature.

In use, the oscillating arm is connected to a mounting head mounted on a drive shaft, where the oscillating arm at one end is pivotally connected to the mounting head by means of a pivot pin and at another end, is connected to the wiper blade placed in abutment with the windscreen to be wiped. In use, the shaft rotates alternately in a clockwise and in a counter-clockwise sense carrying the mounting head into rotation, which in turn draws the oscillating arm into rotation, and by means of the connecting device moves the wiper blade. The oscillating arm can thus oscillate to-and-from between a first and second reversal positions.

In practice each car manufacturer has its own design for the oscillating arm, particularly arranged for a rear window of their car(s). Each design typically has its own length for the oscillating arm. Hence, depending on the car manufacturer, there are several types of (rear) oscillating arms on the market mutually varying in length. Despite these various types of (rear) oscillating arms mutually varying in length, a windscreen wiper device of the flat blade type connected thereto needs to able to wipe the entire (rear) window of each type of car. Hence, although the length of a wiper blade can be changed to a certain extent, depending on the car manufacturer, there is a need for more flexibility to compensate for mutually differing lengths of various types of (rear) oscillating arms presently on the market.

SUMMARY OF THE INVENTION

The object of the invention is to obviate the above disadvantage. According to the invention, a connecting device is proposed for interconnecting a windscreen wiper device of the flat blade type and an oscillating arm pivotally connectable to the connecting device about a pivot axis near one end thereof. The windscreen wiper device comprises an elastic, elongated carrier element, as well as an elongated wiper blade of a flexible material, which can be placed in abutment with a windscreen to be wiped. The wiper blade includes at least one groove, in which a longitudinal strip of the carrier element is disposed. The connecting device comprises a first part arranged to be connected to the windscreen wiper device, as well as a second part arranged to be interposed between the first part and the oscillating arm, where the second part is arranged to be pivotally connected to the first part optionally around a first pivot axis or around a second pivot axis. The term "optionally" means that the user has a choice which pivot axis to use. Preferably, the second part is arranged to be pivotally connected to the first part optionally around a first pivot axis or around a second pivot axis or around a third pivot axis or even more pivot axes. In other words, the effective length of the oscillating arm can be shortened or enlarged by pivotally mounting the second part onto the first part at the location of a first pivot axis in use facing towards the mounting head ("effective length is shortened") or at the location of a second pivot axis in use facing away from the mounting head ("effective length is enlarged"), seen relative to a middle transverse plane of the connecting device in a vertical direction (perpendicular to a windscreen to be wiped). Thus, a universal connecting device is obtained which can be mounted on various types of oscillating arms mutually differing in length, while realizing a standard effective length of these oscillating arms. This connecting device has a broader use and is able to withstand high forces, using a minimum of parts. Preferably, the second part is snapped onto the first part.

In a preferred embodiment of a connecting device in accordance with the invention the pivot axes are spaced-apart in longitudinal direction of the oscillating arm.

In another preferred embodiment of a connecting device according to the invention, the first and second parts are provided with mutually cooperating protrusions/holes to allow a pivotal interconnection of the first and second parts around one of the pivot axes. Particularly, the first part comprises at the location of one of the pivot axes two opposing protrusions extending laterally outwardly arranged to engage into correspondingly shaped holes in the second part. In the alternative, the second part comprises at the location of one of the pivot axes two opposing protrusions extending laterally inwardly arranged to engage into correspondingly shaped holes in the first part. The second part of the connecting device is preferably snapped onto the first part, where the protrusions are snapped into the holes.

In another preferred embodiment of a connecting device in accordance with the invention, the second part has a U-shaped cross-section at the location of its connection to the first part. Preferably, a base of the U-shaped cross-section is provided with a resilient tongue arranged to engage into a correspondingly shaped hole in the oscillating arm. The resilient tongue is preferably arranged to snap into the hole in the oscillating arm. This is a so-called bayonet connection which will be explained further below in the description to the figures.

In another preferred embodiment of a connecting device according to the invention, the first and second parts are each made in one piece of plastic material.

In another preferred embodiment of a connecting device in accordance with the invention, the first part comprises engaging members made integral therewith arranged to engage around the longitudinal strip of the carrier element, where each engaging member forms a slit arranged for receiving the longitudinal strip. In the alternative, the engaging members are arranged to engage around longitudinal strips of the carrier element disposed in opposing grooves of the wiper blade.

The present invention also refers to a windscreen wiper device of the flat blade type comprising an elastic, elongated carrier element, as well as an elongated wiper blade of a flexible material, which can be placed in abutment with a windscreen to be wiped. The wiper blade includes at least one groove, in which a longitudinal strip of the carrier element is disposed. The windscreen wiper device further comprises a connecting device according to the present invention for pivotally connecting an oscillating arm to the connecting device about a pivot axis near one end. The longitudinal groove is preferably a central longitudinal groove accommodating the longitudinal strip.

In the framework of the present invention the following is noted. The connecting device, also called "connector," is preferably made of plastic. The wiper blade is preferably made of an elastomer material, such as rubber, and is preferably made through extrusion. Particularly, for use on a front windscreen to be wiped, the wiper blade comprises a spoiler (also called an "air deflector") at a side facing away from the windscreen to be wiped. The wiper blade and the spoiler are preferably made in one piece. The longitudinal strip is also called a "flexor." Preferably, ends of the longitudinal strip(s) are connected by a respective connecting piece, also called an "end cap."

Further, it is noted that the present invention is not restricted to the use of only one longitudinal strip forming the elastic carrier element that is particularly located in a central longitudinal groove of the wiper blade. Instead, the carrier element may also comprise two longitudinal strips, where the strips are disposed in opposite longitudinal grooves of the wiper blade. The groove(s) may be closed at one outer end. In case of two longitudinal strips, the first part of the connecting device is preferably glued or welded onto the longitudinal strips. It is noted that that the term "welding" in the framework of the present invention also encompasses the term "soldering," where in the latter case a soldering material, preferably a polymer material, is locally applied between the connecting device and the longitudinal strip (or skin of the longitudinal strip). In case of one longitudinal strip, the first part of the connecting device is preferably connected to the flexible material of the wiper blade by means of separate pins extending through the flexible material and the first part of the connecting device in a direction perpendicular to a windscreen to be wiped.

The present invention also relates to a method for manufacturing a windscreen wiper device of the flat blade type comprising an elastic, elongated carrier element, as well as an elongated wiper blade of a flexible material, which can be placed in abutment with a windscreen to be wiped. The wiper blade includes at least one groove, in which a longitudinal strip of the carrier element is disposed. The windscreen wiper device comprises a connecting device for an oscillating arm, where the oscillating arm can be pivotally connected to the connecting device about a pivot axis near one end. The connecting device comprises a first part connected to the windscreen wiper device, as well as a second part interposed between the first part and the oscillating arm. The second part is pivotally connected to the first part optionally around a first pivot axis or around a second pivot axis.

The present invention is not restricted to automobiles, but also refers to rail coaches and other (fast) vehicles.

BRIEF DESCRIPTION OF THE DRAWINGS

The invention will now be explained in more detail with reference to figures illustrated in a drawing, wherein:

FIG. 1a shows a schematic partly cut away outer perspective view of a windscreen wiper device of the flat blade type and a rear oscillating arm according to the invention;

FIG. 1b shows a schematic transparent outer perspective view of a windscreen wiper device of the flat blade type and a rear oscillating arm according to the invention;

FIG. 1c shows a schematic outer perspective view of a windscreen wiper device of the flat blade type and a rear oscillating arm according to the invention;

FIG. 1d shows a schematic outer perspective view of the windscreen wiper device of the flat blade type without the rear oscillating arm;

FIG. 2a shows an enlarged inner perspective view of the windscreen wiper device and the rear oscillating arm of FIG. 1a;

FIG. 2b shows a schematic inner perspective view of the windscreen wiper device and the rear oscillating arm of FIG. 1a;

FIG. 2c shows a schematic outer perspective view of the windscreen wiper device and the rear oscillating arm of FIG. 1a;

DETAILED DESCRIPTION OF THE PREFERRED EMBODIMENT

Figure 3:
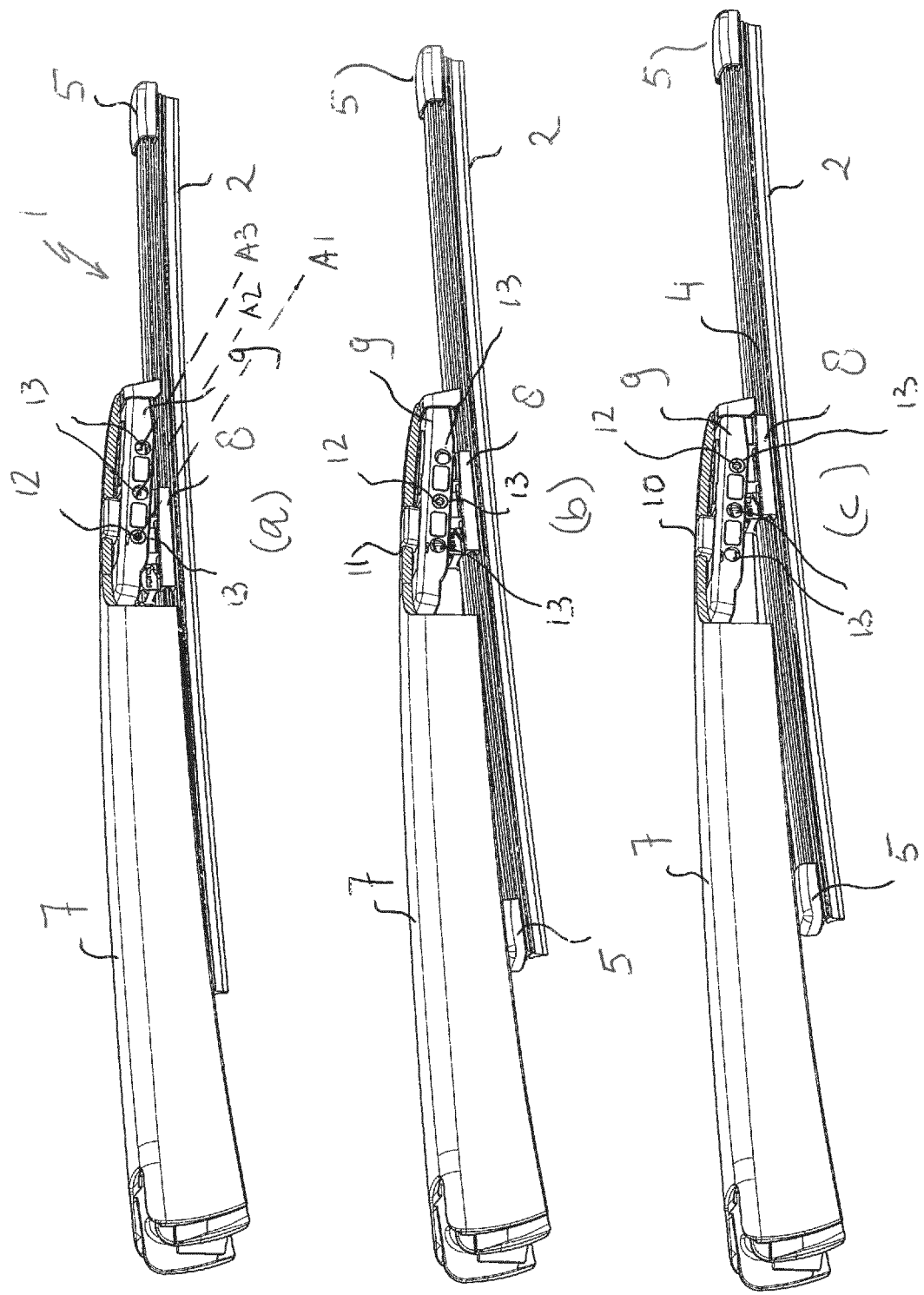
FIG. 3a shows a schematic side view of the windscreen wiper device and the rear oscillating arm of FIG. 1a where a first part of a connecting device is pivotally connected to a second part of the connecting device at a first pivot axis.
FIG. 3b shows a schematic side view of the windscreen wiper device and the rear oscillating arm of FIG. 1a where a first part of a connecting device is pivotally connected to a second part of the connecting device at a second pivot axis.
FIG. 3c shows a schematic side view of the windscreen wiper device and the rear oscillating arm of FIG. 1a where a first part of a connecting device is pivotally connected to a second part of the connecting device at a third pivot axis.

FIGS. 1 and 2 show a windscreen wiper device 1 of the "flat blade" type according to the invention for a rear window of a car. The windscreen wiper device 1 includes an elastomeric wiper blade 2. Opposing longitudinal grooves 3 are formed in the longitudinal sides of the elastomeric wiper blade. The windscreen wiper device 1 also includes longitudinal strips 4 made of spring band steel, which are fitted in the longitudinal grooves 3. The longitudinal strips 4 form a flexible carrier element for the rubber wiper blade 2, which is thus biased in a curved position (the curvature in operative position being that of a windscreen to be wiped). Neighbouring ends of the longitudinal strips 4 are interconnected on either side of the windscreen wiper device 1 by means of connecting pieces 5 or "end caps" functioning as clamping members. In this embodiment, the connecting pieces 5 may be separate constructional elements, which may be form-locked ("positive locking" or "having positive fit"), as well as force-locked to the ends of the longitudinal strips 4. In another preferred embodiment, the connecting pieces 5 are in one piece with the longitudinal strips 4 made of spring band steel. In the latter case the connecting pieces 5 form transverse bridges for the longitudinal strips 4.

With reference to FIGS. 1, 2 and 3, the windscreen wiper device 1 also includes a connecting device 6 of plastic material for a rear oscillating arm 7. The connecting device 6 comprises a first part 8 rigidly connected to the longitudinal strips 4 through gluing, welding or soldering, as well as a second part 9 pivotally connected to the first part through a snapping (or "clicking") operation. The oscillating arm 7 and a unit consisting of the connecting device 6 and the wiper blade 2 are interconnected through a so-called bayonet connection as follows. The second part 9 of the connecting device 6 comprises a resilient tongue 10 extending outwardly and engaging in an identically shaped hole 11 provided in a base of a U-shaped cross-section of the oscillating arm 7. First, the connecting device 6 is easily slid on a free end of the oscillating arm 7. During this sliding movement the resilient tongue 10 is initially pushed in against a spring force and then allowed to spring back into the hole 11 in the oscillating arm 7, thus snapping, that is clipping, the resilient tongue 10 into the hole 11 of the oscillating arm 7. By subsequently pushing in again the resilient tongue 10 against the spring force (as if it were a push button), the connecting device 6 together with the wiper blade 2 may be released from the oscillating arm 7. Dismounting the connecting device 7 with the wiper blade 2 from the oscillating arm 7 is thus realized by sliding the connecting device 6 together with the wiper blade 2 in a direction away from the oscillating arm 7. Reference is made to European patent publication no, 1 403 156 of the same Applicant, which is herewith incorporated by reference.

With reference to particularly FIG. 3, the first part 8 of the connecting device 6 comprises two cylindrical protrusions 12 extending outwards on either side thereof, i.e. on each vertical side wall thereof. The second part 9 of the connecting device 6 comprises three pairs of opposing cylindrical holes 13 on either side thereof, i.e. in each vertical sidewall thereof. These pairs of cylindrical holes 13 are spaced apart in longitudinal direction of the oscillating arm 7. In other words, the middle pair of holes 13 is in the middle transverse plane (MTP) of the second part 9, seen in a direction perpendicular to the windscreen to be wiped, whereas the outside pairs of holes 13 in use are facing towards and facing away from the mounting head (not shown). These protrusions 12 are arranged to pivotally engage in the identically shaped cylindrical holes 13 of each pair. In fact, as shown in FIG. 3, the protrusions 12 pivotally engage in the pair of holes 13 in use facing towards the mounting head (FIG. 3a), in the pair of holes 13 in the middle transverse plane (MTP) of the second part 9 (FIG. 3b), seen in a direction perpendicular to the windscreen to be wiped, or in the pair of holes 13 in use facing away from the mounting head (FIG. 3c). The effective length of the oscillating arm 7 can therefore be standardized, also in the case of various types of oscillating arms 7 mutually varying in length. The protrusions 12 act as bearing surfaces at the location of a pivot axis in order to pivot the second part 9 of the connecting device 6 (and the oscillating wiper arm 7 attached thereto) about one of the pivot axes (A1,A2,A3) near a free end of the oscillating wiper arm 7. Reference is made to FIG. 3a. The protrusions 12 are preferably in one piece with the connecting device 6. In the alternative, the protrusions 12 are part of a single pivot pin perpendicular to the connecting device 6.

The present invention is not restricted to the preferred embodiments shown, but also extends to other embodiments falling in the scope of the appended claims.

The invention claimed is:

1. A windscreen wiper device comprising:
an oscillating arm;
connecting device for interconnecting a windscreen wiper device of the flat blade type and the oscillating arm pivotally connectable to said the connecting device about a pivot axis near one end thereof, wherein the windscreen wiper device comprises an elastic, elongated carrier element, as well as an elongated wiper blade of a flexible material, which can be placed in abutment with a windscreen to be wiped, which wiper blade includes at least one groove, in which groove a longitudinal strip of the carrier element is disposed, wherein the connecting device comprises:
a first part connected to the windscreen wiper device; and
a second part adapted to be interposed between said first part and the oscillating arm, wherein said second part is adapted to be pivotally connected to said first part around a first pivot axis or around a second pivot axis to shorten or enlarge an effective length of said oscillating arm by pivotally mounting said second part onto said first part at the location of said first pivot axis in use facing towards a mounting head for said oscillating arm or at the location of said second pivot axis in use facing away from said mounting head, viewed relative to a middle transverse plane of the connecting device in vertical direction.

2. The windscreen wiper device according to claim 1, wherein said second part is adapted to be pivotally connected to said first part around a third pivot axis.

3. The windscreen wiper device according to claim 1, wherein said pivot axes are spaced-apart in longitudinal direction of the oscillating arm.

4. The windscreen wiper device according to claim 1, wherein said first and second parts are provided with mutually cooperating protrusions and holes to allow a pivotal interconnection of said first and second parts around one of said pivot axes.

5. The windscreen wiper device according to claim 4, wherein said protrusions extend laterally outwardly from said first part at said first pivot axis or said second pivot axis, and wherein said holes comprise correspondingly shaped recesses in said second part.

6. The windscreen wiper device according to claim 4, wherein said protrusions extend laterally inwardly from said second part at said first pivot axis or said second pivot axis, and wherein said holes comprise correspondingly shaped recesses in said first part.

7. The windscreen wiper device according to claim 1, wherein said second part has a U-shaped cross-section at said first pivot axis or said second pivot axis.

8. The windscreen wiper device according to claim 7, wherein a base of said U-shaped cross-section includes a resilient tongue adapted to engage into a correspondingly shaped hole in the oscillating arm.

9. The windscreen wiper device according to claim 8, wherein said resilient tongue is adapted to snap into said hole in the oscillating arm.

10. The windscreen wiper device according to claim 1, wherein said first and second parts are each made in one piece of plastic material.

11. The windscreen wiper device according to claim 1, wherein said first part comprises engaging members made integral therewith adapted to engage around the longitudinal strip of the carrier element, wherein each engaging member forms a slit adapted to receive the longitudinal strip.

12. The windscreen wiper device according to claim 1, wherein said engaging members are arranged to engage around longitudinal strips of the carrier element disposed in opposing grooves of the wiper blade.

13. The connecting device according to claim 1, wherein said first part comprises engaging members made integral therewith adapted to engage around said longitudinal strip of said carrier element, wherein each engaging member forms a slit adapted to receive said longitudinal strip.

14. A windscreen wiper device of the flat blade type comprising:
an elastic, elongated carrier element;
an elongated wiper blade of a flexible material, which can be placed in abutment with a windscreen to be wiped, wherein said wiper blade includes at least one groove wherein a longitudinal strip of said carrier element is disposed in said at least one groove;
an oscillating arm; and a connecting device adapted to pivotally connect to the oscillating arm about a pivot axis near one end thereof, wherein said connecting device comprises:
- a first part connected to said longitudinal strip; and
- a second part adapted to be interposed between said first part and the oscillating arm, wherein said second part is adapted to be pivotally connected to said first part around a first pivot axis or around a second pivot axis to shorten or enlarge an effective length of said oscillating arm by pivotally mounting said second part onto said first part at the location of said first pivot axis in use facing towards a mounting head for said oscillating arm or at the location of said second pivot axis in use facing away from said mounting head, viewed relative to a middle transverse plane of the connecting device in vertical direction.

15. The connecting device according to claim 14 wherein said second part is further adapted to be pivotally connected to said first part around a third pivot axis.

16. The connecting device according to claim 14, wherein said pivot axes are spaced-apart in longitudinal direction of the oscillating arm.

17. The connecting device according to claim 14, wherein said first and second parts are provided with mutually cooperating protrusions and holes to allow a pivotal interconnection of said first and second parts around one of said pivot axes.

18. The connecting device according to claim 17, wherein said protrusions extend laterally outwardly from said first part at said first pivot axis or said second pivot axis, and wherein said holes comprise correspondingly shaped recesses in said second part.

19. The connecting device according to claim 17, wherein said protrusions extend laterally inwardly from said second part at said first pivot axis or said second pivot axis, and wherein said holes comprise correspondingly shaped recesses in said first part.

20. The connecting device according to claim 14, wherein said second part has a U-shaped cross-section at said first pivot axis or said second pivot axis, and wherein a base of said U-shaped cross-section includes a resilient tongue adapted to engage into a correspondingly shaped hole in the oscillating arm.

\* \* \* \* \*